(12) United States Patent
Kashima

(10) Patent No.: US 6,819,372 B2
(45) Date of Patent: Nov. 16, 2004

(54) BACK LIGHT DEVICE WITH DIFFUSING SHEET FOR A LIQUID CRYSTAL DISPLAY APPARATUS

(75) Inventor: Keiji Kashima, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/515,675

(22) Filed: Feb. 29, 2000

(65) Prior Publication Data

US 2001/0055077 A1 Dec. 27, 2001

Related U.S. Application Data

(62) Division of application No. 09/130,462, filed on Aug. 7, 1998.

(30) Foreign Application Priority Data

Aug. 27, 1997 (JP) .............................................. 9-230584

(51) Int. Cl.[7] ........................ G02F 1/1335; G01D 11/28; F21V 7/04
(52) U.S. Cl. ........................... 349/65; 349/64; 349/112; 362/26; 362/31
(58) Field of Search ............................. 349/65, 61, 112, 349/113, 64; 362/26, 31

(56) References Cited

U.S. PATENT DOCUMENTS

| | | | |
|---|---|---|---|
| 4,088,400 A | 5/1978 | Assouline et al. ............. 353/20 |
| 5,126,882 A | * 6/1992 | Oe et al. ........................ 349/57 |
| 5,143,433 A | 9/1992 | Farrell ............................ 362/29 |
| 5,225,920 A | * 7/1993 | Kasazumi et al. ............. 359/69 |
| 5,262,928 A | 11/1993 | Kashima et al. ............... 362/31 |
| 5,418,631 A | * 5/1995 | Tedesco ........................ 359/15 |
| 5,461,547 A | 10/1995 | Ciupke et al. ................. 362/31 |
| 5,587,816 A | 12/1996 | Gunjima et al. ............... 349/62 |

(List continued on next page.)

FOREIGN PATENT DOCUMENTS

| JP | A-3-75705  | 3/1991  |
|----|------------|---------|
| JP | A-4-184424 | 7/1992  |
| JP | A-6-265892 | 9/1994  |
| JP | A-7-261122 | 10/1995 |

OTHER PUBLICATIONS

Masakazu et al., "Anovel protective diffuser for backlit LCDs", SID 00 Digest.*

Primary Examiner—Tarifur R. Chowdhury
(74) Attorney, Agent, or Firm—Oliff, Berridge, PLC

(57) ABSTRACT

A back light device 10 comprises a light source 12, a lightconductor 14 for outputting light from the light source from its outputting surface 14B, a light diffusing sheet 16 for receiving diffused light from the lightconductor 14 and shifting the maximum intensity direction to the direction of the normal standing on the light outputting face 16B, a polarized beam splitting sheet 18 through which one polarized light component among the light from the light diffusing sheet 16 is transmitted and on which the other polarized light component is reflected.

12 Claims, 13 Drawing Sheets

U.S. PATENT DOCUMENTS

| | | | | |
|---|---|---|---|---|
| 5,600,462 A | * | 2/1997 | Suzuki et al. | 349/112 |
| 5,627,926 A | | 5/1997 | Nakamura et al. | 349/112 |
| 5,629,784 A | | 5/1997 | Abileah et al. | 349/112 |
| 5,691,788 A | | 11/1997 | Kim | 349/112 |
| 5,706,065 A | | 1/1998 | Yano | 349/112 |
| 5,712,694 A | * | 1/1998 | Taira et al. | 349/9 |
| 5,724,111 A | | 3/1998 | Mizobata et al. | 345/112 |
| 5,748,369 A | | 5/1998 | Yokota | 359/487 |
| 5,751,480 A | | 5/1998 | Kitagishi | 359/485 |
| 5,753,937 A | * | 5/1998 | Shimomaki et al. | 257/59 |
| 5,793,456 A | | 8/1998 | Broer et al. | 349/62 |
| 5,808,709 A | | 9/1998 | Davis et al. | 349/65 |
| 5,816,677 A | | 10/1998 | Kurematsu et al. | 362/31 |
| 5,831,698 A | | 11/1998 | Depp et al. | 345/112 |
| 5,839,823 A | * | 11/1998 | Hou et al. | 362/327 |
| 5,870,156 A | * | 2/1999 | Heembrock | 349/64 |
| 5,887,964 A | * | 3/1999 | Higuchi et al. | 362/31 |
| 5,917,565 A | * | 6/1999 | Suzuki | 349/65 |
| 5,956,107 A | * | 9/1999 | Hashimoto et al. | 349/64 |
| 5,961,198 A | * | 10/1999 | Hira et al. | 362/31 |
| 6,011,601 A | * | 1/2000 | Kojima | 349/62 |
| 6,018,379 A | * | 1/2000 | Mizobata et al. | 349/112 |
| 6,044,196 A | * | 3/2000 | Winston et al. | 385/146 |
| 6,256,145 B1 | * | 7/2001 | Kono et al. | 359/457 |
| 6,280,063 B1 | * | 8/2001 | Fong et al. | 549/112 |

* cited by examiner

GRAPH INDICATION
(ORIENTATION CHARACTERISTIC)
MAXIMUM BRIGHTNESS 1581 [cd/m^2]
MINIMUM BRIGHTNESS 26.52 [cd/m^2]
AVERAGE BRIGHTNESS 708.4 [cd/m^2]

GRAPH INDICATION
(ORIENTATION CHARACTERISTIC)
MAXIMUM BRIGHTNESS  1224 [cd/m^2]
MINIMUM BRIGHTNESS  29.39 [cd/m^2]
AVERAGE BRIGHTNESS  679.7 [cd/m^2]

GRAPH INDICATION
(ORIENTATION CHARACTERISTIC)
MAXIMUM BRIGHTNESS 944.2 [cd/m^2]
MINIMUM BRIGHTNESS 21.03 [cd/m^2]
AVERAGE BRIGHTNESS 647.3 [cd/m^2]

GRAPH INDICATION
(ORIENTATION CHARACTERISTIC)
MAXIMUM BRIGHTNESS  943.2 [cd/m^2]
MINIMUM BRIGHTNESS  23.34 [cd/m^2]
AVERAGE BRIGHTNESS  645.9 [cd/m^2]

GRAPH INDICATION
(ORIENTATION CHARACTERISTIC)
MAXIMUM BRIGHTNESS 2119 [cd/m^2]
MINIMUM BRIGHTNESS 25.65 [cd/m^2]
AVERAGE BRIGHTNESS 774.9 [cd/m^2]

GRAPH INDICATION
(ORIENTATION CHARACTERISTIC)
MAXIMUM BRIGHTNESS 1947 [cd/m^2]
MINIMUM BRIGHTNESS 28.02 [cd/m^2]
AVERAGE BRIGHTNESS 765.2 [cd/m^2]

BACK LIGHT DEVICE WITH DIFFUSING SHEET FOR A LIQUID CRYSTAL DISPLAY APPARATUS

This is a Division of application Ser. No. 09/130,462 filed Aug. 7, 1998. The entire disclosure of the prior application is hereby incorporated by reference herein in its entirety.

BACKGROUND OF THE INVENTION

1. Field of the Invention

The present invention relates to a back light device used for a liquid crystal display apparatus and the like, and a liquid crystal display apparatus using the same.

2. Related Arts

Recently, there has been widely used a liquid crystal display apparatus wherein a liquid crystal panel is illuminated from its back with a back light device, as various display apparatuses such as a display for a computer, or a television.

In such a liquid crystal display apparatus, polarized light obtained by causing light to transmit a polarizing plate is modulated in its liquid crystal layer.

For example, FIG. 18 illustrates a representative structure of a liquid crystal display apparatus comprising a conventional back light device.

In this liquid crystal display apparatus 1, the back light device 2 causes light outputted from a light source 3 to be incident onto one side end face 4A of a lightconductor 4 in a substantially plate form, and to be outputted from a light outputting surface 4B (the upper surface in FIG. 18), and then the outputted light for the light outputting surface 4B is diffused with a diffusing sheet 5 and converged in a prism sheet 6 to illuminate a liquid crystal cell 7 from its back.

The light made incident onto the side end face 4A, from the light source, goes forwards inside the lightconductor 4 with being totally reflected therein, and the advancing direction of a part of the light is changed by means of light diffusing spots 4D arranged on a back face 4C to be outputted from the light outputting surface 4B to the outside the lightconductor 4. The light outputted downward from the back surface 4C (the lower surface in FIG. 18) opposite to the light outputting surface 4B of the lightconductor 4 is reflected on a reflecting sheet 8 to be again returned into the lightconductor 4.

The prism sheet 6 is a sheet on which triangle pole prisms are arranged in such a form that their ridge lines are in parallel, and the liquid crystal cell 7 has structure wherein its front and back faces are sandwiched by polarizing plates 9A and 9B.

FIGS. 19 and 20 illustrate other conventional liquid crystal display apparatuses, respectively. The liquid crystal display apparatus 1A shown in FIG. 19 is different from the apparatus shown in FIG. 18 in that a diffusing sheet 5 and a prism sheet 6A in a back light device 2A are arranged oppositely to those in the back light device 2 shown in FIG. 18, and that the triangle pole prisms on the prism sheet 6A are arranged to be directed downward, that is, oppositely to the prisms shown in FIG. 18. Other structure is the same as in the apparatus shown in FIG. 18. Thus, the same reference numbers are attached to the same elements, and explanation thereof is omitted.

In a back light device 2B in the liquid crystal display apparatus 1B shown in FIG. 20, between the diffusing sheet 5 and the prism sheet 6A in the back light device 2A shown in FIG. 19, arranged is the third prism sheet 6B wherein the direction of its triangle pole prisms is perpendicular to the prism sheet 6A. Other structure is the same as in the liquid crystal display apparatus 1A shown in FIG. 19.

In all of the display apparatuses 1, 1A and 1B, the liquid crystal cell 7 is sandwiched by the polarizing plates 9A and 9B, and the polarizing plates 9A and 9B absorb about 50% of the incident light beam so that the efficiency for using the light is low. Thus, in order to obtain sufficient brightness, it is necessary that a greater deal of light is made incident onto the polarizing plate. In this case, however, various problems are caused. For example, power consumption for the light source increases, and heat from the light source has a bad influence on the liquid crystal in the liquid crystal cell 7 so that it is difficult to watch the display.

In order to overcome the above-mentioned problems, the following prior art inventions for improving the efficiency for using light are proposed in, for example, Japanese Patent Application Laid-Open (JP-A-) No. 4-184429, 6-265892, and 7-261122: A polarized beam splitting sheet is used to separate non-polarized light from a light source into two linearly polarized light beams which are perpendicular to each other, and then the one of the polarized light beams obtained from the separation is made incident onto a liquid crystal cell, and the other, which is a parallel component, is returned to the light source side so as to be again introduced into the polarized beam splitting sheet, for use, by reflection and the like.

In the invention disclosed in JP-A-No. 4-184429, non-polarized light from a light source is divided into two polarized beams which are perpendicular to each other with a polarized beam splitter, and then the one polarized light is outputted directly toward a liquid crystal, and the other polarized light is returned to the light source side to be converged, followed by being reflected to be again made incident onto the polarized beam splitter.

In the invention disclosed in JP-A-No. 6-265892, a light deflector comprising a prism array is disposed at the light outputting surface of a planar lightconductor so that the outputted light will be substantially perpendicular to the surface of this planer lightconductor, and further at the light outputting surface side, a polarized beam splitting means is disposed which comprises a polarized beam splitting layer deposited on the inclined plane of the prism array, for example in a triangle pole form.

In the invention disclosed in JP-A-No. 7-261122, a polarized beam splitting sheet is disposed at the light outputting surface side of an element for producing parallel luminous flux, comprising a light scattering lightconductor including a portion having a cross sectional shape of a wedge.

The invention disclosed in JP-A-No. 4-184429 is applied to a projection type liquid crystal display apparatus, and an illuminating device therein requires a large space. This cannot be applied to a plane type liquid crystal display apparatus, wherein a back light device is located adjacently to the back face of a liquid crystal panel.

The invention disclosed in JP-A-No. 6-265892 is applied to a thin liquid crystal display apparatus. However, the structure of the polarized beam splitting means comprising a triangle pole prism array is complicated. It is especially difficult to form the polarized beam splitting layer on the inclined plane of the triangle pole prism array. Thus, there remains a problem that mass production thereof is difficult.

In the invention disclosed in JP-A-No. 7-261122, the element for producing parallel luminous flux, comprising, as a lightconductor, a specific light scattering lightconductor having a cross sectional shape of a wedge is used and consequently there remains a problem that it is difficult to control the light scattering lightconductor so as to have a specific light scattering ability.

In the light of the aforementioned problems, an object of the present invention is to provide a back light device which can be made thin by using a relatively simple structure and which has excellent mass producibility and improved efficiency for using light; and a liquid crystal display apparatus using the back light device.

SUMMARY OF THE INVENTION

This object is accomplished by means of a back light device according to the present invention comprising:

a light source;

a lightconductor in a substantial plate form comprising a front face, a back face and side end faces, light radiated from the light source and made incident on the one of the side end faces being outputted as diffused light from the front face as a light outputting surface;

at least one light diffusing sheet for receiving, on its face, the diffused light outputted from the light outputting surface of the lightconductor, and outputting, from the light outputting surface opposite to the surface, shifting the maximum intensity direction of the diffused light toward the direction of the normal standing on the light outputting surface, and outputting the diffused light;

a polarized beam splitter sheet which can receive the light from the light outputting surface of the light diffusing sheet, through which one polarized light component of the light is transmitted, and on which the other polarized light component is reflected; and a light reflecting sheet which is arranged on the back face of the lightconductor and is for reflecting the light into the lightconductor.

The polarized beam splitting sheet may be a laminated body having 3 or more layers wherein the layers adjacent to each other in its thickness direction have different refractive indexes; and one of incident P and S polarized light beams are transmitted through the sheet and the other is reflected on the sheet, thereby splitting both of the polarized light beams.

The polarized beam splitting sheet may include a circularly polarized light selecting layer comprising a cholesteric liquid crystal layer, and a ¼ phase differentiation layer; and by means of the cholesteric liquid crystal layer incident light is splitted into one circularly polarized light component along one rotation direction and the other circularly polarized light component along the reverse rotation direction.

The polarized beam splitting sheet may have a planar laminated structure having three or more layers each of which has double refraction; and the difference in the refractive index between the layers adjacent to each other along its thickness direction for one of two light beams having vibration directions perpendicular to each other in a plane is different from the difference in the refractive index between the layers adjacent to each other along its thickness direction for the other of the two light beams.

The light diffusing sheet may be composed of a light-transmissive material wherein its light outputting surface is rougher than its light receiving surface.

Furthermore, the above-mentioned object is accomplished by means of a liquid crystal display apparatus comprising the above-mentioned back light device, and a liquid crystal panel arranged at the light outputting surface side of the polarized beam splitting sheet of the back light device.

In the present invention, by means of the light diffusing sheet the maximum intensity direction of the diffused light can be shifted nearer to the direction of the normal standing on the light outputting surface. Thus, the diffused light can be shifted near to the angle of incident light which makes the polarized beam splitting effect maximum. Synergistic effect of this action and the function of the light diffusing sheet itself that polarized light is converted into non-polarized light makes it possible to obtain a back light device which is thin, low-priced, highly efficient and suitable for mass production.

DESCRIPTION OF PREFERRED EMBODIMENTS OF THE INVENTION

Preferred embodiments of the present invention will be described below, referring to the attached drawings.

Figure 1:
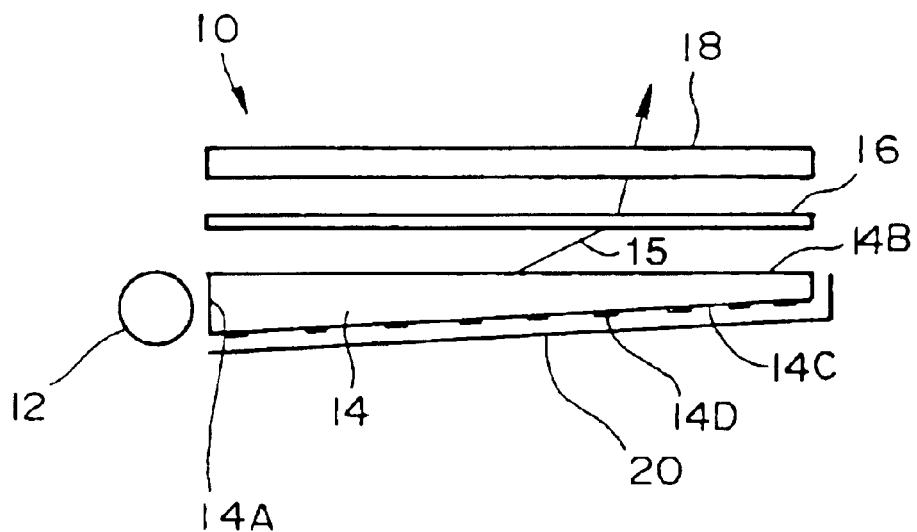
FIG. 1 is a schematic cross section of a back light device according to an embodiment of the present invention.

A back light device 10 shown in FIG. 1 has a light source 12; a lightconductor 14 in a substantial plate form having front, back and side end faces for outputting the light emitted from the light source 12 and made incident onto one of the side end faces 14A, from a light outputting surface 14B which is the front face, as diffused light; a light diffusing sheet 16 wherein its light receiving surface 16B (shown in FIG. 2) can receive the diffused light outputted from the light outputting surface 14B of the lightconductor 14, and the scattered light can be outputted from a light outputting surface 16A (shown in FIG. 2) opposite to the aforementioned light receiving surface 16B, with the maximum intensity direction of the scattered light being shifted to the direction of the normal standing on the light outputting surface 16A; a polarized beam splitting sheet 18 for receiving the light from the light outputting surface 16A of the light diffusing sheet 16 so that one polarized light component among the light can transmit this sheet 18 and the other polarized light component can be reflected on this sheet 18; and a light reflecting sheet 20 which is arranged at the back face 14C side of the lightconductor 14 and is for reflecting light into the lightconductor 14.

The light source 12 may be a linear light source such as a cool cathode-ray tube, or may be a light source wherein plural spot light sources are arranged in a line along the side end face 14A of the lightconductor 14.

The lightconductor 14 is a member for making the peak of the diffused light outputted from the light outputting surface 14B oblique to the normal standing on the light outputting surface 14B as shown by reference number 15 in FIG. 1.

The lightconductor 14 is composed of a material through which light can penetrate effectively. The material include, for example, acrylic resins such as PMMA (polymethylmethacrylate), polycarbonate resin and glass.

The shape of the lightconductor 14 is in a substantially flat plate form (which includes a wedge form wherein its thickness becomes smaller as its distance from the end surface 14A becomes larger, and the like form). On the back face 14C thereof, disposed is a light diffusing layer 14D wherein the surface of a light-transmissive resin itself is made rough. The light diffusing layer 14D is made into dot or stripe forms by printing or the like.

Light diffusing ability may be generated by incorporating an element such as Si, Ba or Ti into the light-transmissive resin constituting the lightconductor 14.

The light diffusing sheet 16 is, for example, a sheet wherein a light diffusing means is applied to a light-transmissive material such as PC(polycarbonate) or PET (polyethyleneterephthalate), and may be any one having capability of diffusion and transmission of light.

Figure 2:
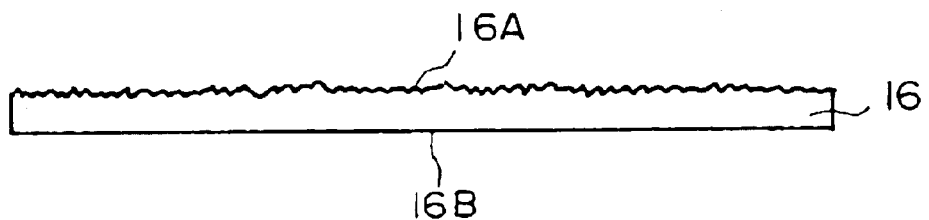
FIG. 2 is a schematic, enlarged cross section of a light diffusing sheet in the back light device.

As shown in FIG. 2, in the light diffusing sheet 16 its light outputting surface 16A is subjected to embossment treatment so that the surface 16A is made rougher than the light receiving surface 16B. In this case, the light diffusing sheet 16 may be a sheet made of PC having a thickness from 0.1 to 2 mm.

The light diffusing sheet 16 has, as a criterion of light diffusion effect, preferably a haze value of 10% or more, and more preferably 30% or more. If the haze value is within this range, the action that the maximum intensity direction of the diffused light from the lightconductor 14 is shifted nearer to the normal standing on the light outputting surface 16A becomes great.

Figure 3:
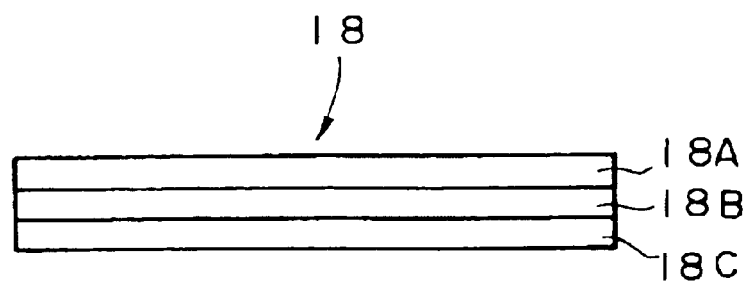
FIG. 3 is a schematic, enlarged cross section of a polarized beam splitting sheet in the back light device.

As shown in FIG. 3, the polarized beam splitting sheet 18 has a structure wherein 3 light-transmissive sheets 18A–18C having refractive indexes which are different from each other are laminated.

The material of the light-transmissive sheets 18A–18C may be any one having light-transmissive ability, and is not limited to a specific material. The material may be, for example, polyester such as PET, PC, acrylic resins such as PMMA, TAC (triacetate cellulose), glass, silica or ITO (Indium Tin Oxide).

When light passes through the interfaces of the light-transmissive sheets 18A–18C having different refractive indexes as describe above, there is caused a phenomenon that the transmitted light and the reflected light are polarized (polarized beam splitting effect).

The polarized beam splitting effect is varied dependently on the angle of light incident on the polarized beam splitting sheet 18, In the case wherein the angle of incidence is the Brewster angle, that is, in the case wherein the angle of incident light is selected so that the angle between the refracted light at the aforementioned interface and the reflected light thereon will be 90 degrees, the polarized beam splitting effect becomes maximum.

In the case wherein the angle of incident light is the Brewster angle, the ratio of intensity of the S polarized light component in the reflected light to that of the P polarized light component in the transmitted light (Ts/Tp) is equal to $[2n'/(1+n'^2)]^{-4}$ when in the air (its refractive index=1) a light-transmissive sheet (its refractive index: n'>n) is used.

In order to obtain intensive polarized beam splitting effect, at least 3 and preferably 5 or more of the light-transmissive sheets should be used.

When light from the light diffusing sheet 16 is made incident on the polarized beam splitting sheet 18 as above, the transmitted light contains a great deal of the P polarized light component and the reflected light contains a great deal of the S polarized light component.

The light reflecting sheet 20 may be any one having capability of reflecting light. The material for it is not limited. For example, the sheet 20 may be a sheet containing many bubbles inside PET and having a thickness of 0.1–2 mm and a diffusion reflectivity of 80% or more, or a sheet wherein a metal such as Al or Ag is vapor-deposited on the surface of PET, the sheet having a thickness of 0.1–1 mm and a mirror reflectivity of 80% or more.

The following will describe the action of the back light device 10.

Light outputted from the light source 12 is made incident on the side end face 14A to go inside the lightconductor 14, and then the light is totally reflected repeatedly between the light outputting surface 14B and the back face 14C to go toward the opposite side end face.

A part of the light going inside the lightconductor 14 is changed in its advancing direction by the light diffusing layer 14D formed on the back face 14C, so as to go from the light outputting surface 14B into the lightconductor 14.

In FIG. 1, the light outputted downward from the back face 14C of the lightconductor 14 is reflected on the light reflecting sheet 20 to be returned into the lightconductor 14.

The light outputted from the light outputting surface 14B is diffused by the light diffusing sheet 16. At that time, however, the maximum intensity direction of the diffused light from the lightconductor 14 is shifted nearer to the normal standing on the light outputting surface 16A because the light outputting surface 16A of the light diffusing sheet 16 is rougher than the light receiving surface 16B.

The reflected light containing a great deal of the S polarized light component reflected on the polarized beam splitting sheet 18 is conversed from a polarized light state into a non-polarized light state by means of the light diffusing sheet 16, the light diffusing layer 14D in the lightconductor 14, the light reflecting sheet 20 and the like, so as to go from the light outputting surface 14B through the light diffusing sheet 16 and be again made incident on the polarized beam splitting sheet 18.

In such a manner as above, the light outputted from the light outputting surface 14B of the lightconductor 14 goes through the aforementioned path, so that the light transmits through the polarized beam splitting sheet 18 with less loss of the light and then is outputted, as back light containing a lot of the P polarized light component, from the light outputting surface of the polarized beam splitting sheet 18.

The lightconductor 14 is a member wherein the light diffusing layer 14D is deposited on the back face 14C, as shown in FIG. 1, but is not limited to this member. The lightconductor may be any one wherein the peak of diffused light outputted from its light outputting surface has an oblique direction component to the normal standing on this light outputting surface.

Figure 4A:
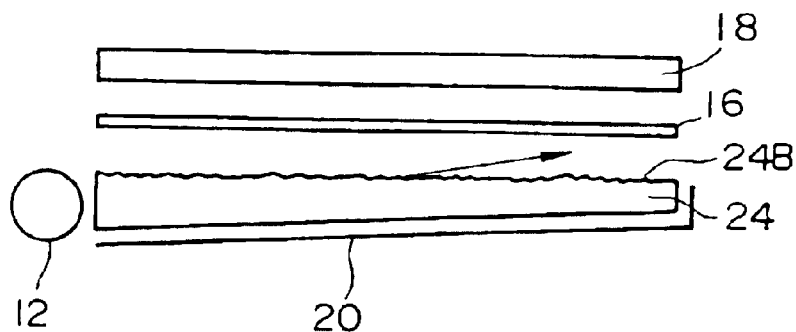
FIGS. 4(A) to 4(D) are individually a schematic cross section of another lightconductor in the back light device.
Figure 4B:
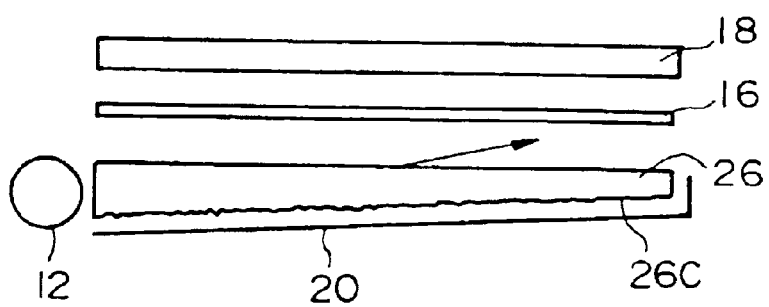
Figure 4C:
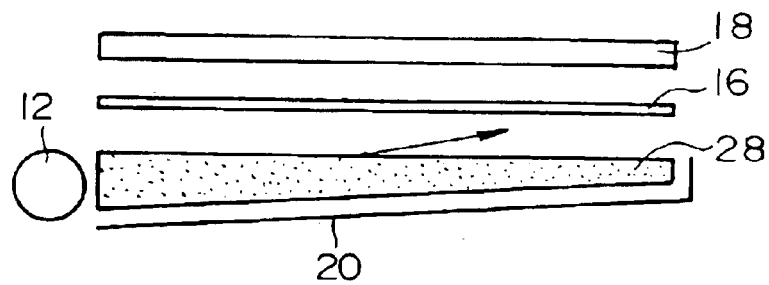

Therefore, the lightconductor may be a lightconductor 24 wherein a light outputting surface 24B is made coarse as shown in FIG. 4(A), a lightconductor 26 wherein its back face 26C is made coarse as shown in FIG. 4(B), or a lightconductor 28 containing therein, as a light diffusing material, a light-transmissive material (such as silicone resin having a refractive index of 1.43) having a refractive index different from a material (such as PMMA having a refractive index of 1.49) constituting the main portion of the lightconductor 28 as shown in FIG. 4(C).

Figure 4D:
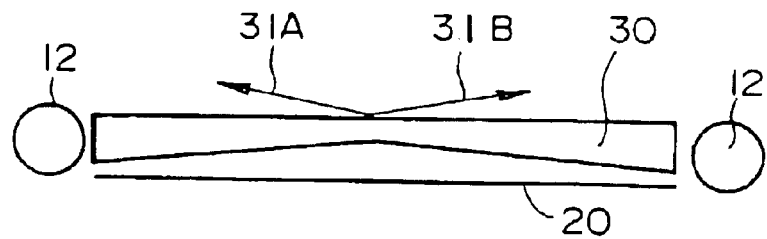

The lightconductor 30 is made to have the thinnest shape in the middle of the two light sources 12 and 12 when the light from the light source is made incident on two side end faces of a lightconductor 30, as shown in FIG. 4(D). In this case, the peaks of diffused light from the light outputting surface are along two directions as shown by reference numbers 31A and 31B in this figure.

In the light diffusing sheet 16, embossment is used as a means for making the light outputting surface 16A rougher than the light receiving surface 16B. This means is not limited to the embossment. By using any other means the light outputting surface may be made rougher than the light receiving surface.

Figure 5:
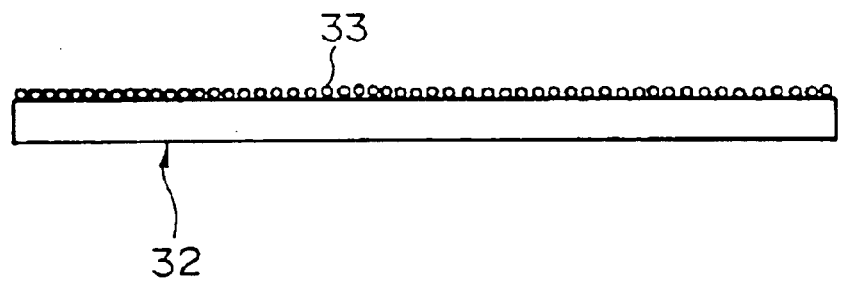
FIG. 5 is a schematic cross section of another light diffusing sheet in the back light device.

For example, by coating the light outputting surface of a sheet comprising PET having a thickness of 0.1–2 mm with acrylic beads 33 having an average particle size of 1–10 μm, the light outputting surface may be made rougher than the light receiving surface, as is shown as a light diffusing sheet 32 in FIG. 5.

The light diffusing sheet is not limited to a single layer structure as shown in FIGS. 2 and 5. As shown in, e.g., FIG. 6, plural light diffusing sheets 34 may be stacked, preferably in the state that they sandwich 2 or 3 air layers.

In this case, it is possible to shift the maximum intensity direction of the diffused light from the lightconductor even nearer to the normal standing on the light outputting surface of the light diffusing sheet, as compared with the case of using a light diffusing sheet which is the same sort as above and has the same haze value as above.

As described above, the light diffusing sheet wherein its light outputting surface is rougher than its light receiving surface has a greater function of shifting the maximum intensity direction of the diffused light from the lightconductor near to the direction of the normal standing on the light outputting surface than the light diffusing sheet wherein the light outputting surface and the light receiving surface having the same haze values have the same rough degrees, which are in general compared with a surface roughness meter, and the light diffusing sheet wherein the light receiving surface is rougher than the light outputting surface and they have the same haze values.

In the polarized beam splitting sheet 18, in order to effectively return the light returned to the side of lightconductor 14 by reflecting on the interface of the light transmissive sheet from a polarized light state to a non-polarized light state, the haze value of the light diffusing sheet is 10 or more and preferably 30 or more, and the light diffusion reflectivity of the light reflecting sheet is 70 or more and more preferably 80 or more.

In the back light device 10 according to this embodiment, the maximum intensity direction of the diffused light can be shifted near to the angle of incident light which makes the polarized beam splitting effect maximum in the polarized beam splitting sheet 18 (the Brewster angle or the normal direction) by means of the light diffusing sheet 16 having a function of shifting the maximum intensity direction of the diffused light from the lightconductor 14 nearer to the direction of the normal standing on the light outputting surface. This action, together with the function of the light diffusing sheet 16 itself that polarized light is converted into non-polarized light, causes the back light device to be very thin, low-priced and suitable for mass production and have a few parts, and makes it possible to obtain a highly efficient back light device.

Figure 7:
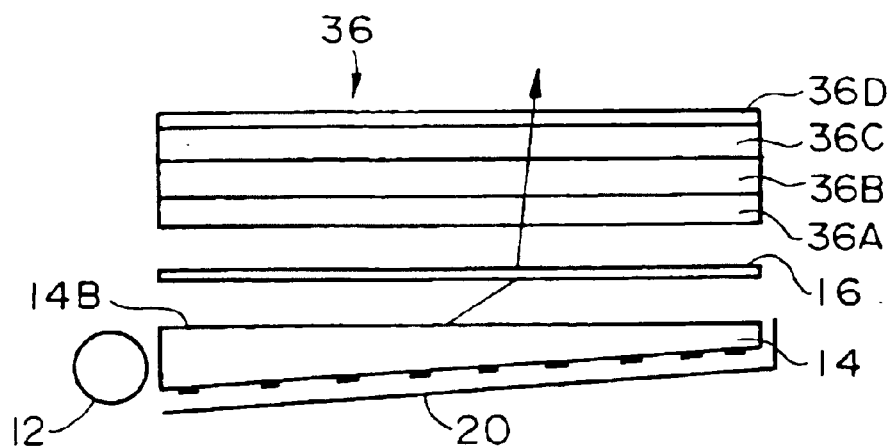
FIG. 7 is a schematic cross section of a back light device according to still another embodiment of the invention.

The following will describe another embodiment of the polarized beam splitting sheet according to the invention, referring to FIG. 7.

This polarized beam splitting sheet 36 has a laminated structure wherein a PET layer 36A, a cholesteric liquid crystal layer 36B, a ¼ phase differentiation layer 36C and a TAC layer are arranged in sequence, viewed from the light receiving surface.

The cholesteric liquid crystal layer 36B can be made to have a function of splitting incident light into an optical rotation beam component along one direction and an optically rotary beam component along a reverse direction.

In general, the cholesteric liquid crystal exhibits such an optical rotation selection power as above on the basis of its physical molecular arrangement, and light which is made incident on a helical axis of a planar arrangement is splitted into two circularly polarized light beams, that is, right-handed circularly polarized light and left-handed circularly polarized light. The one thereof is transmitted through the liquid crystal and the other thereof is reflected on the liquid crystal.

This phenomenon is known as circular dichroism. When for incident light, the rotation direction of the circular polarization is appropriately selected, circularly polarized light which has the same circular polarization direction as the helical axis direction of the cholesteric liquid crystal is selectively scattered and reflected.

In this case, the maximum light scattering takes place at the wavelength $\lambda 0$ according to the equation (1):

$$\lambda 0 n_{av} \times p \qquad (1)$$

wherein p represents a helical pitch and nav represents an average refractive index of a plane perpendicular to the helical axis.

At this time, the wavelength band width of the reflected light is represented by the following equation (2):

$$\Delta\lambda = \Delta n \times p \qquad (2)$$

$\Delta n$ is equal to $n(\|)-n$ (a right angle) wherein $n(\|)$ represents the maximum refractive index inside the plane perpendicular to the helical axis and n (a right angle) represents the maximum refractive index inside the plane in parallel to the helical axis.

It is also known that the wavelength $\lambda_\phi$ of the light which is made incident obliquely on the helical axis of the planar arrangement is shifted to a shorter wavelength than $\lambda 0$.

It is preferred that a material of cholesteric liquid crystal is a chiral nematic liquid crystal compound wherein an optically active 2-methylbutyl group, 2-methylbutoxy group or 4-methylhexyl group is bonded to the terminal group of a nematic liquid crystal compound such as a shiff base, or an azo, ester or biphenyl compound.

Generally, a high molecular liquid crystal is a high molecule wherein a mesogen group exhibiting a liquid crystal state is incorporated into its main chain, its side chain, or its main and side chains. A high molecular cholesteric liquid crystal can be obtained by, for example, introducing a cholesteryl group into the side chain.

The polarized beam splitting effect of the cholesteric liquid crystal is that one of circularly polarized light components (right-handed or left-handed rotation) is transmitted through the cholesteric liquid crystal and the other of the components is reflected on the liquid crystal.

Because, for the back light for illuminating the back of the liquid crystal display apparatus, linearly polarized light is used as incident light, it is preferred to use the cholesteric liquid crystal layer 36B together with the ¼ phase differentiation layer as decried above.

The functions of the cholesteric liquid crystal and ¼ phase differentiation layer are disclosed in, for example, "SID 90 DIGEST, p 110–113, Polarizing Color Filters Made from Cholesteric LC Silicone".

The angle of incident light which makes the polarized beam splitting effect of the cholesteric liquid crystal maximum depends on the orientation in the cholesteric liquid crystal, but it is preferred to make the direction of the helical axis equal to that of the normal standing on the polarized beam splitting sheet 36. For the orienting process, a known process for using raving or polarized UV may be used.

When light is made incident on the polarized beam splitting sheet 36 as described above, one circularly polarized light component (the right-handed or left-handed rotation) is transmitted through the cholesteric liquid crystal 36B and then the transmitted circularly polarized light is converted into linearly polarized light in the ¼ phase differentiation layer 36C. Thereafter, the light goes through the TAC layer 36D to be outputted from the upper surface (the light outputting surface) in FIG. 7.

On the other hand, the reflected light which is reflected on the cholesteric liquid crystal layer 36B and returned to the side of the lightconductor 14 is converted from a polarized state to a non-polarized state by means of the light diffusing sheet 16, the light diffusing layer 14D in the lightconductor 14, the light reflecting sheet 20 and the like in the same manner as in FIG. 1, and then again is made incident on the polarized beam splitting sheet 36 for reuse.

The haze value and the light diffusion reflectivity required for the light diffusing sheet 16 and the light reflecting sheet 20 are the same as in the embodiment shown in FIG. 1. In the present embodiment, by means of the light diffusing sheet 16 the maximum intensity direction of the diffused light can be shifted near to the angle of incident light which makes the polarized beam splitting function of the polarized beam splitting sheet 36 maximum, that is, to the helical axis direction of cholesteric liquid crystal, in the same manner as in the embodiment shown in FIG. 1. This action, together with the function of the light diffusing sheet 16 itself that polarized light is converted into non-polarized light, makes it possible to obtain a low-priced and highly efficient back light device which can easily produced.

Figure 8:
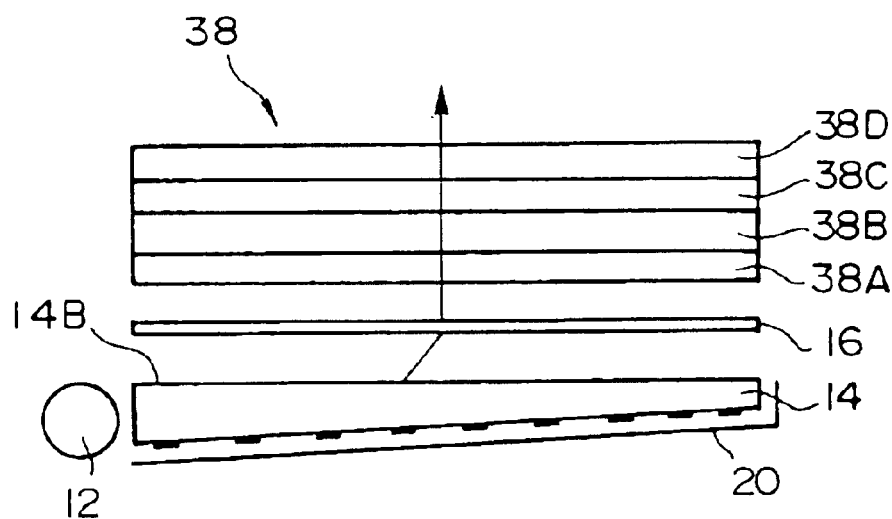
FIG. 8 is a schematic cross section of a back light device according to other embodiment of the invention.

The following will describe still another embodiment of the polarized beam splitting sheet according to the invention, referring to FIG. 8.

The polarized beam splitting sheet 38 shown in FIG. 8 has a planar laminated structure wherein 4 layers which have double refraction are laminated. In the sheet 38, for one of two light beams having vibration directions perpendicular to each other in a plane, the difference in refractive indexes between the layers which are arranged adjacently to each other along the thickness direction is substantially zero, but for the other of the two light beams the difference in refractive indexes between the layers which are arranged adjacently to each other along the thickness direction is not substantially zero. Thus, the one of the two light beams is transmitted through the sheet 38, but the other is reflected thereon.

As disclosed in, for example, JP-A-No. 3-75705, each of the double refraction layers 38A–38D can be obtained by, for example, a process of extending a material having in-plane double refraction (refractive index anisotropy) such as polycarbonate resins, polyester resins, polyvinyl alcohol resins and cellulose acetate.

Specifically, in the case wherein the polarized beam splitting sheet 38 is composed of the four double refraction layers 38A–38D as shown in an enlarged view of FIG. 9 and two light vibration directions perpendicular to each other are specified in a plane as shown by the reference symbols X and Y in FIG. 9, the refractive indexes of the respective double refraction layers 38A–38D are as follows.

For example, the refractive indexes of the double refraction layers 38A, 38B, 38C and 38D are substantially the same for the light beam vibrating in the X axis direction, that is, $n_x$. Therefore, the difference in the refractive indexes between the layers adjacent to each other in the X axis direction $\Delta n_x$ $(=|n_x-n_x|)$ is substantiality zero. The refractive indexes of the double refraction layers 38A and 38C are $n_{y1}$ for the light beam vibrating in the Y axis direction, and the refractive indexes of the double refraction layers 38B and 38D are $n_{y2}$ $(n_{y1} \ne n_{y2})$ for the light beam vibrating in the Y axis direction. Therefore, the difference in the refractive indexes $\Delta n_y$ $(=|n_{y1}-n_{y2}|)$ between the layers adjacent to each other in the Y axis direction is not substantially zero. Thus, the difference in the refractive indexes $\Delta n_x$ between the layers adjacent to each other in the X axis direction is substantially different from the difference in the refractive indexes $\Delta n_y$ between the layers adjacent to each other in the Y axis direction Polarized light is splitted by using a polarized beam splitter composed of a planar laminated structure wherein in such a manner as above the refractive index difference between the adjacent layers for the one direction of two light beams vibrating direction perpendicular to each other in a plane is different from the refractive index difference between the adjacent layers for the other direction. Namely, the reflection of the light beam vibrating in the direction along which the refractive index difference is large (for example, the Y axis direction) is larger than the reflection of the light beam vibrating in the direction along which the refractive index difference is small (for example, the X axis direction). The transmission of the light beam vibrating in the direction along which the refractive index difference is small (for example, the X axis direction) is larger than the transmission of the light beam vibrating in the direction along which the refractive index difference is large (for example, the Y axis direction).

In a more preferred embodiment, the smaller refractive index difference is substantially zero, and in this case the light beam vibrating in the direction making the refractive index difference small is not reflected but transmitted. Namely, the polarized beam splitter is used which comprises a planar laminated structure wherein in one direction of 2 light beam vibration directions perpendicular to each other in a plane (e.g., in the X axis direction) the refractive indexes of the adjacent layers are substantially the same, and in the other direction (e.g., in the Y axis direction) the refractive indexes of the adjacent layers are different. If such a polarized beam splitter as above is used, it is possible that the polarized light is more successfully splitted (for example, the light beam vibrating in the X axis direction is transmitted and the light beam vibrating in the Y axis direction is reflected). Of course, in this case the polarized beam splitting ability is higher as the large refractive index difference is greater.

This reason, when explained referring to the above-mentioned example, is as follows. For the light beam vibrating in the X axis direction, the refractive index inside the planar laminated structure is substantially the same, and consequently only a little surface reflection takes place at two points where light is made incident on this planar laminated structure and is outputted from it. However, for the light beam vibrating in the Y axis direction, the refractive index inside the planar laminated structure is different between the respective adjacent layers, and consequently surface reflection takes place at the light receiving surface of this structure, the light outputting surface thereof, and between the respective layers inside this structure. Accordingly, the surface (interface) reflection more frequently takes place as the number of the layers of the polarized beam splitter is larger. Thus, the light beam vibrating in the Y axis direction is more reflected on this splitter.

Figure 9:
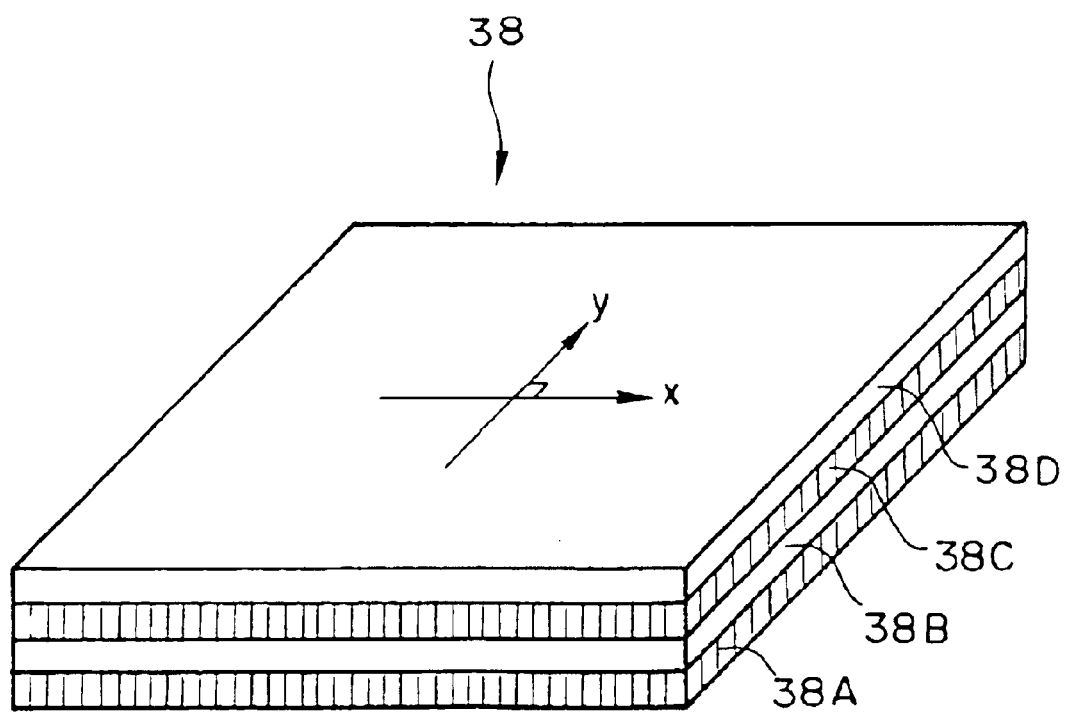
FIG. 9 is a enlarged perspective view of a polarized beam splitting sheet in the back light device shown in FIG. 8.

The polarized beam splitting sheet has 4 layers in FIGS. 8 and 9, but is not limited to this structure. The sheet has at least 3 layers, and ideally has 5 or more layers. As the laminated number of double refraction layers constituting the polarized beam splitting sheet is larger, the light beam vibrating in other directions can be more surely reflected. The number of the laminated layers is actually up to about 100.

The angle of incident light which makes polarized beam splitting effect maximum in the polarized beam splitting sheet 38 is along the direction of the normal standing on the surface of the polarized beam splitting sheet 38.

For measuring a polarized beam-splitted state, linearly polarized light wherein vibration directions of light beams cross at right angles may be used.

In the present embodiment, the maximum intensity direction of the diffused light from the lightconductor 14 can be shifted nearer to the direction of the normal standing on the light outputted surface by means of the light diffusing sheet 16. Therefore, the maximum intensity direction of the diffused light can approximate to the angle of incident light which maximizes the polarized beam splitting effect of the polarized beam splitting sheet 38. This action, together with the function of the light diffusing sheet 16 itself that polarized light is converted into non-polarized light, makes it possible to obtain a highly efficient and thin back light device which is suitable for mass production and has a few parts.

Figure 10:
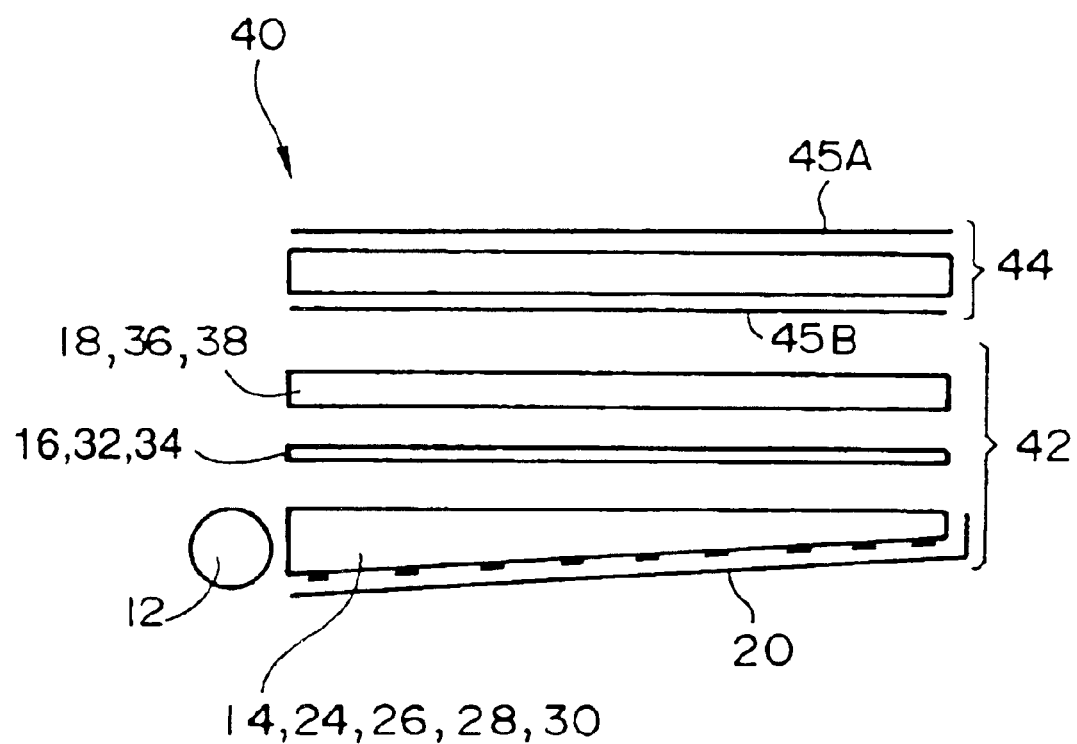
FIG. 10 is a schematic cross section of a liquid crystal display apparatus according to an embodiment of the invention.

The following will describe an embodiment of the liquid crystal display apparatus according to the invention, referring to FIG. 10.

The liquid crystal display apparatus 40 comprises a back light device wherein appropriate ones of the lightconductors 14, 24, 26, 28 and 30, the light diffusing sheets 16, 32 and 34, the polarized beam splitting sheets 18, 36 and 38, and the light reflecting sheet 20 are combined; and a liquid crystal panel 44 whose back face is illuminated by the back light device 42. The axis of polarized light outputted from the back light device 42 is made substantially consistent with the polarized light transmitting axis of the polarizing plate 45B on the back faces (i.e., at the back light side) among the polarizing plates 45A and 45B arranged on the front and back faces of the liquid crystal panel 44. Thus, the polarized light can be transmitted through this apparatus efficiently.

EXAMPLES

The first example of the invention was the back light device 10 using the polarized beam splitting sheet 18 shown in FIG. 3.

The lightconductor 14 in the back light device 10 was a member wherein on its back face the light diffusing layer 14D in dot forms was printed and formed. The polarized beam splitting sheet 18 had a structure where, in turn from the light receiving surface, PC layers and PMMA layers were adjacently and alternately laminated, the total number of the layers being 100 (3 layers in FIG. 3, but 100 layers in the example device). As shown in FIG. 5, the light outputting surface of the light diffusing sheet 32 composed of PET thick 125 $\mu$m was coated with acrylic beads 33 having an average particle size of 10 $\mu$m so that the light outputting surface would be rougher than the light receiving surface.

The light reflecting sheet 20 was composed of a white PET sheet containing many bubbles inside. The maximum intensity direction of the diffused light from the lightconductor 14 was made consistent with the Brewster angle of the polarized beam splitting sheet 18 by means of the light diffusing sheet 32.

The polarized light-transmissive direction axis of the polarizing plate at the side of the lightconductor 14 in the liquid crystal (not illustrated) was made consistent with the polarized light axis of the light outputted from the polarized beam splitting sheet 18, so that the polarized light was efficiently transmitted through the device.

When the liquid crystal panel was set to a transmissive mode, the maximum brightness of the light outputted from the polarizing plate at the front face side was measured. As a result, the maximum brightness was a 30% improved value, as compared with the back light device which did not have the polarized beam splitting sheet 18 nor the light diffusing sheet 32.

Figure 11:
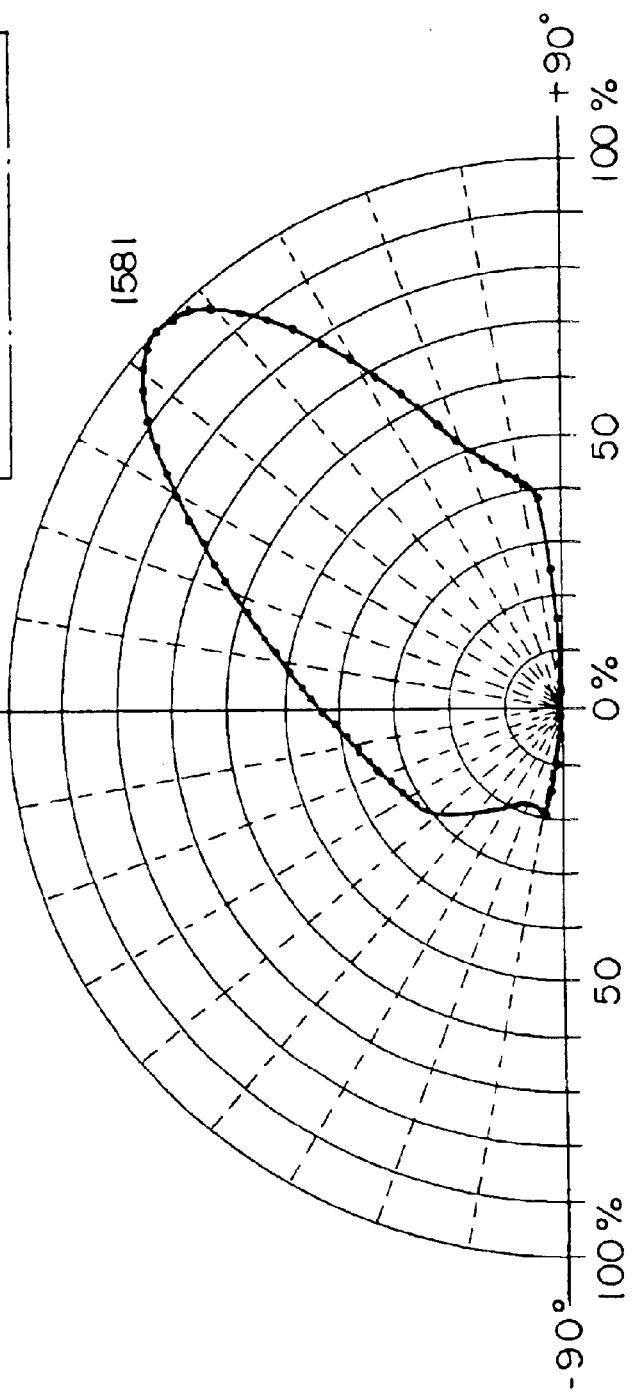
FIG. 11 is a view showing an orientation characteristic about the light outputting surface of a light diffusing sheet used in the first example of the invention.

The shift effect of the diffused light caused by the light diffusing sheet 32 with which the acrylic beads were coated is shown in FIG. 11.

Table 1 shows the haze value (HAZE), the transmissivity of the total light (Tt), and the transmissivity of the diffused light (Td) of the light outputting surface, which was coated with the acrylic beads 33, and the light receiving surface of the light diffusing sheet 32.

TABLE 1

|  | HAZE | Tt | Td |
| --- | --- | --- | --- |
| Incident on the rough surface | 86.9 | 97.2 | 84.8 |
| Incident on the smooth surface | 86.0 | 85.5 | 73.8 |

FIG. 11 demonstrates that the direction of the maximum brightness was about 45 degrees to the normal standing on the light outputting surface.

Figure 12:
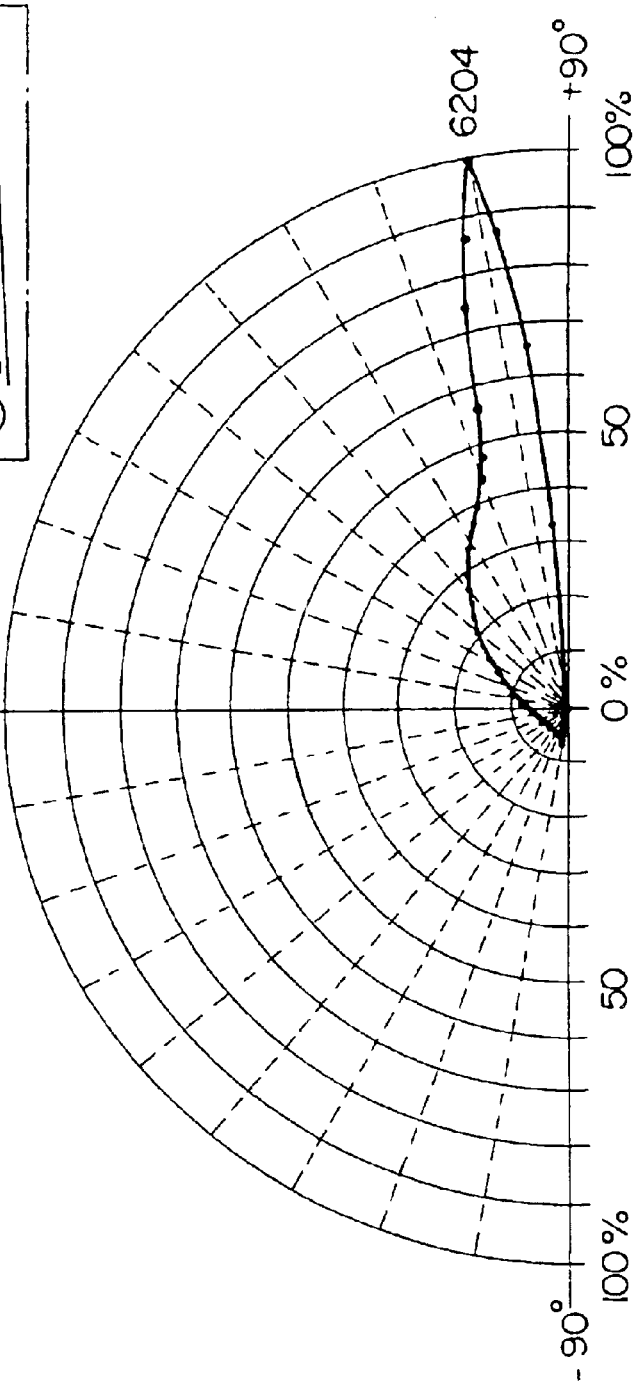
FIG. 12 is a view showing an orientation characteristic about the light outputting surface of only a lightconductor, wherein any light diffusing sheet is not used.
Figure 13:
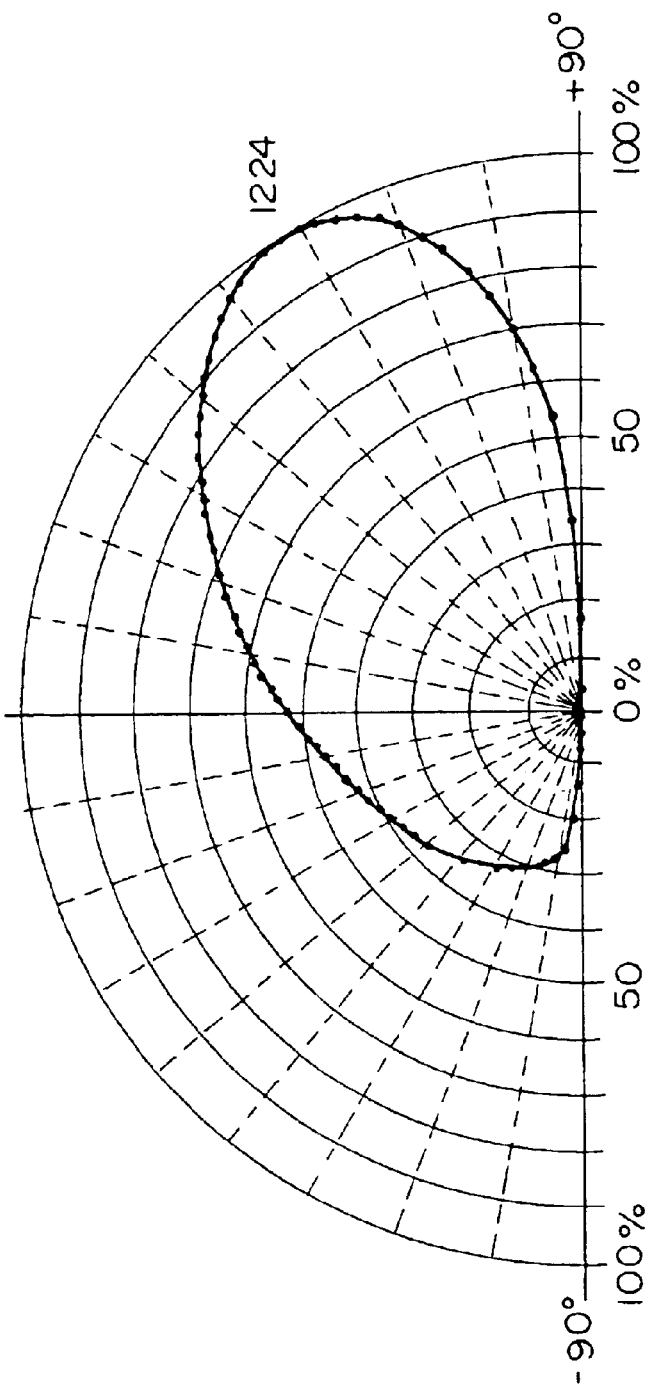
FIG. 13 is a view showing an orientation characteristic about the light outputting surface of a case wherein the front and back faces of the light diffusing sheet shown in FIG. 11 are reversed.

On the contrary, in the case of only a lightconductor not using any light diffusing sheet, the direction of the maximum brightness was about 80 degrees to the normal standing on the light outputting surface, as shown in FIG. 12. In the case wherein the front and back faces of the light diffusing sheet 32 were reversed, that is, the face which was coated with the acrylic beads 33 was turned into a light receiving surface, the direction of the maximum brightness of the light outputting surface was about 60 degrees to the normal standing on the light outputting surface, as shown in FIG. 13.

In short, the maximum intensity direction of the diffused light was able to be shifted, to a large extent, to the direction of the normal on the light outputting surface by using the light diffusing sheet 32.

For comparison, light diffusing sheets having different forms were used to investigate the orientation properties at their light outputting surfaces. The results thus obtained are shown in FIGS. 14-17.

Figure 14:
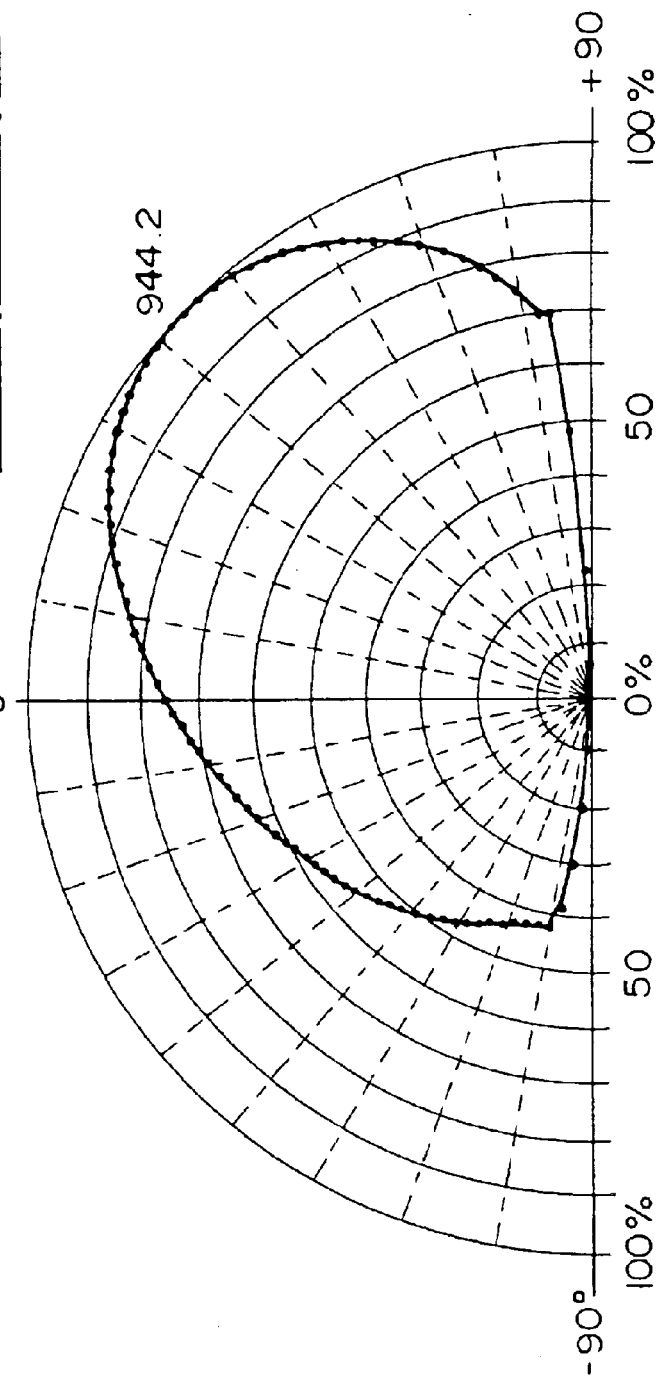
FIG. 14 is a view showing an orientation characteristic about the light outputting surface of a light diffusing sheet wherein its front and back faces have the same shape for comparison with the present invention.
Figure 15:
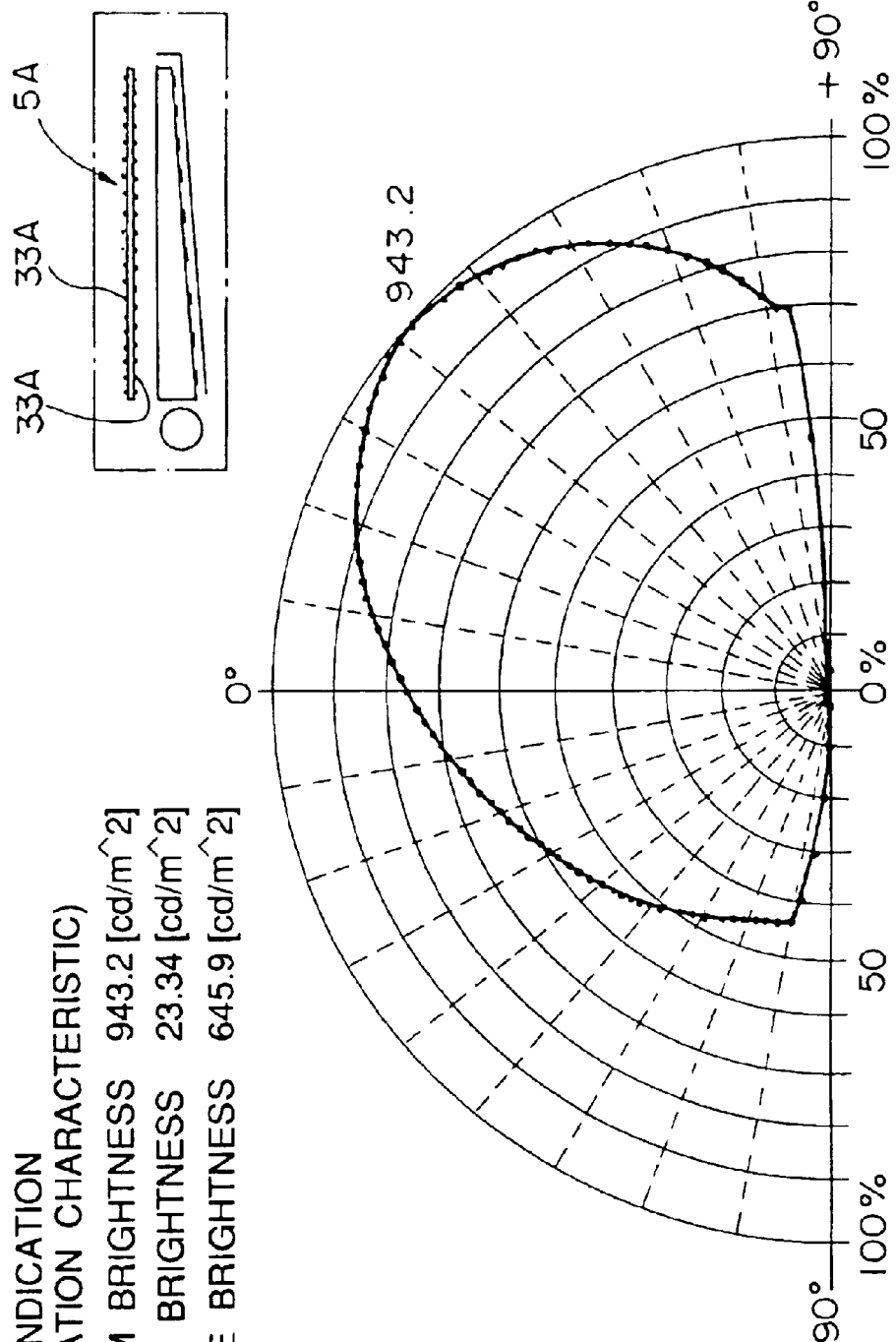
FIG. 15 is a view showing an orientation characteristic of a case wherein the front and back faces of the light diffusing sheet shown in FIG. 14 are reversed.

In the example shown in FIG. 14, a light diffusing sheet 5A was used which had two faces coated with acrylic beads 33A and was formed so as to have properties shown in Table

2.

TABLE 2

|  | HAZE | Tt | Td |
|---|---|---|---|
| Incident on A surface | 92.2 | 84.5 | 78.5 |
| Incident on B surface | 92.4 | 84.7 | 78.6 |

In this case, the maximum intensity direction of the light outputting surface of the light diffusing sheet 5A was about 45 degrees to the normal standing on the light outputting surface. However, the diffused light was uniformly scattered and its directivity was lowered. Maximum brightness was also lowered. In the case shown in FIG. 15, a light diffusing sheet was used wherein the front and back faces of the light diffusing sheet 5A were reversed.

Figure 16:
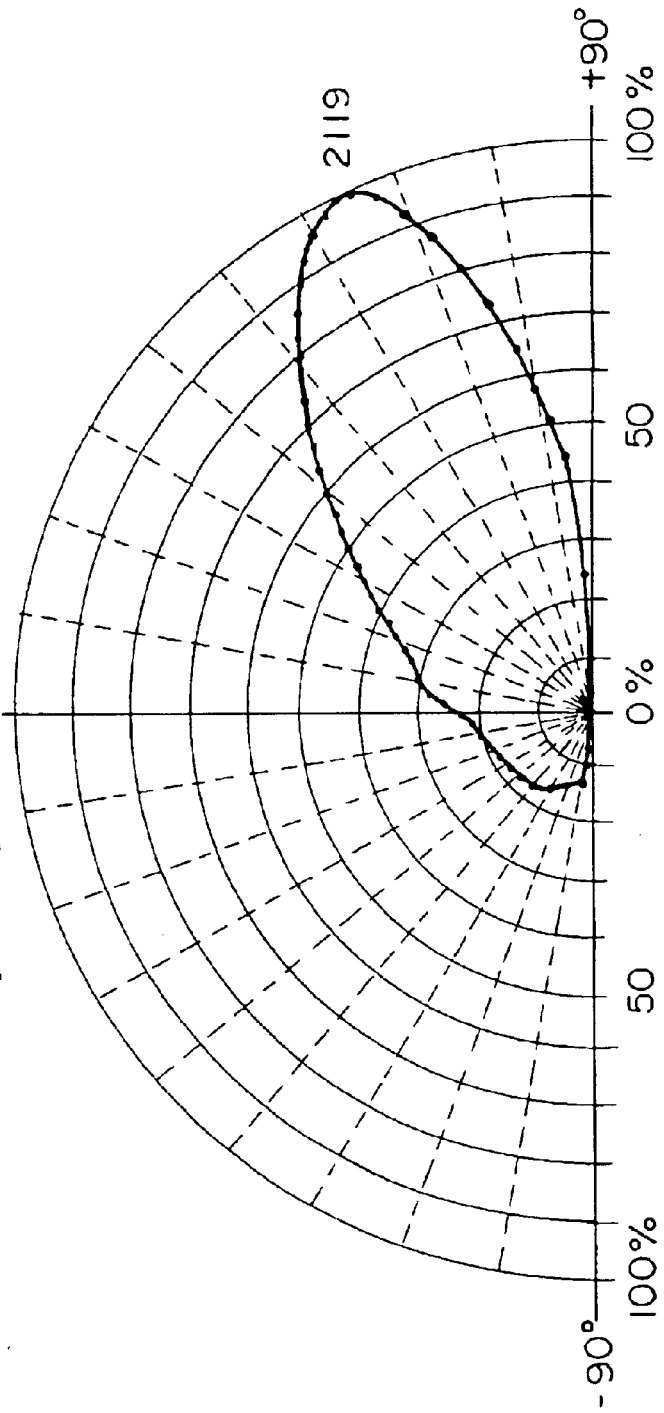
FIG. 16 is a view showing an orientation characteristic of a case of a light diffusing sheet in which a face thereof is made rough and the other face is made smooth, the haze values on both the faces are same, and the rough face is set to function as a light outputting surface.

FIG. 16 shows results obtained from the case wherein there was used a light diffusing sheet 5B wherein roughness was formed on one face thereof and the haze value of the rough face 33B was made equal to that of the opposite face 33C as shown in FIG. 3, and wherein the rough face 33B was set so as to function as a light outputting surface.

TABLE 3

|  | HAZE | Tt | Td |
|---|---|---|---|
| Incident on the rough surface | 37.8 | 88.6 | 33.7 |
| Incident on the flat surface | 37.8 | 88.7 | 33.7 |

Figure 17:
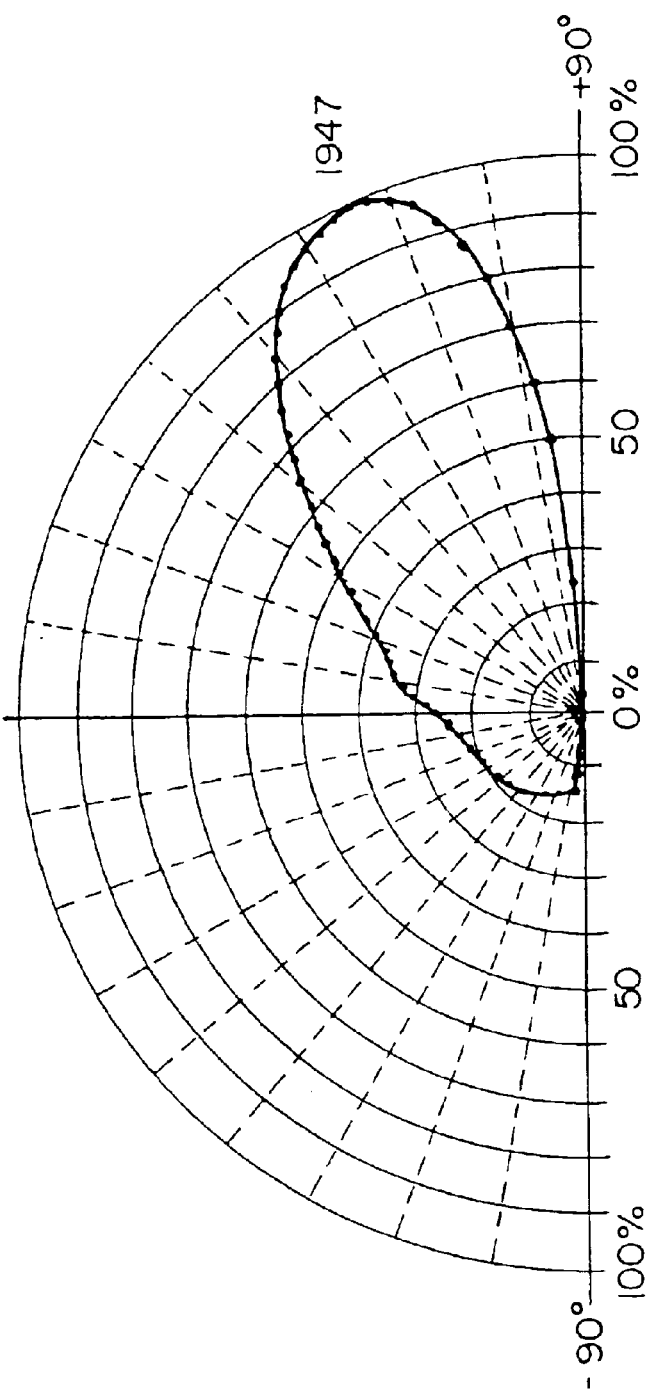
FIG. 17 is a view showing an orientation characteristic of an example using a light diffusing sheet wherein the front and back faces of the light diffusing sheet shown in FIG. 16 are reversed.
Figure 18:
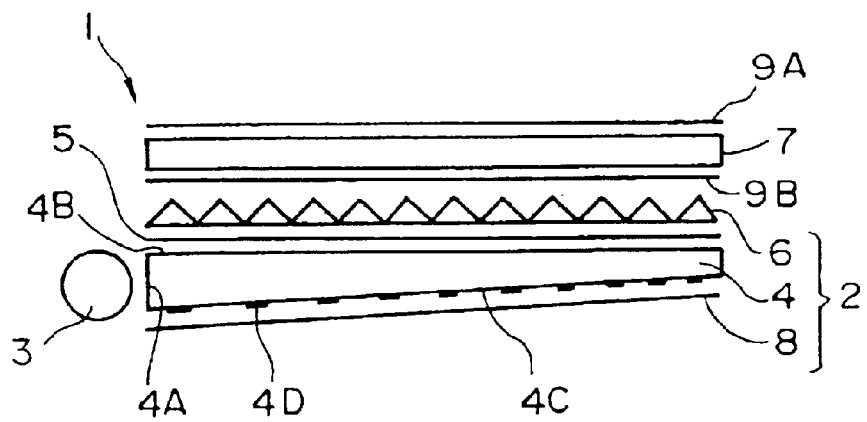
FIG. 18 is a schematic sectional view of a liquid crystal display apparatus including a back light device in the prior art.
Figure 19:
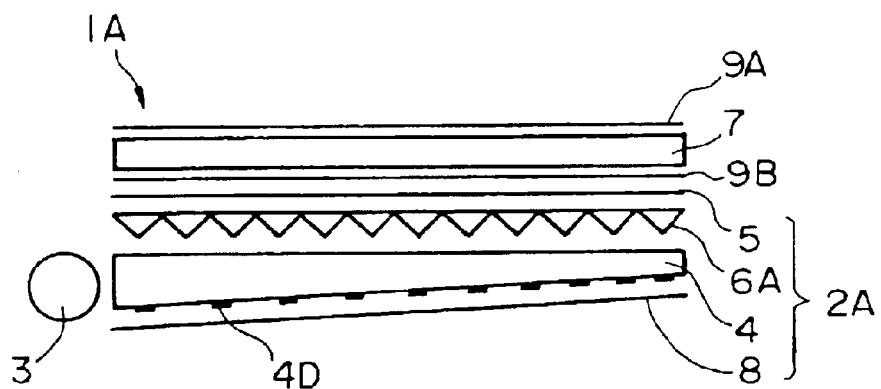
FIG. 19 is a schematic sectional view of a liquid crystal display apparatus including another back light device in the prior art.
Figure 20:
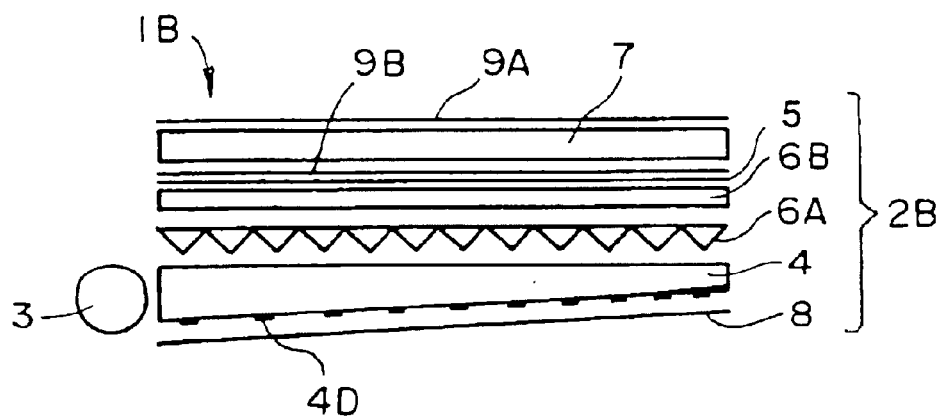
FIG. 20 is a schematic sectional view of a liquid crystal display apparatus including still another back light device in the prior art.

FIG. 17 shows results obtained from the case wherein there was a used a light diffusing sheet wherein the front and back faces of the light diffusing sheet 5B used in the case shown in FIG. 16 were reversed. In all of the case, the angles between the maximum intensity direction of the diffused light from the light outputting surface and the direction of the normal on the light outputting surface were from 60 to 65 degrees, which were large.

The following will describe the second example according to the invention.

Figure 6:
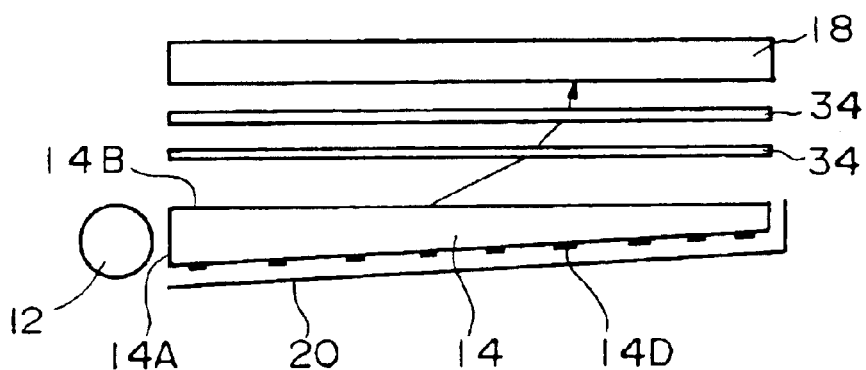
FIG. 6 is a schematic cross section of a back light device using a light diffusing sheet of another embodiment.

The second example was different from the first example in that there was used a polarized beam splitting sheet 36 comprising a cholesteric liquid crystal layer 36B and a ¼ phase differentiation layer 36C as shown in FIG. 7, and 2 light diffusing sheets 34 were stacked to sandwich an air layer as shown in FIG. 6. The other structure in the second example was the same as in the first example.

The doubly stacked light diffusing sheets 34 were made so that when diffused light was made incident on the sheets 34 and the light was outputted from its light outputting surface, its maximum intensity direction was made consistent with the direction of the normal on the polarized beam splitting sheet 36.

Furthermore, the polarized light transmissive direction axis of the polarizing plate at the lightconductor side of the liquid crystal panel (not illustrated) was consistent with the polarized light axis of the light outputted from the polarized beam splitting sheet 36, so that the polarized light was efficiently transmitted through the device.

When the liquid crystal panel in this structure was set to a transmissive mode and the maximum brightness of the light outputted from the polarizing plate at the front face side was measured, 60% improved brightness was obtained, as compared with the back light device not using any light diffusing sheet nor polarized beam splitting sheet.

The following will describe the third example of the invention.

In the third example, the polarized beam splitting sheet 38 shown in FIG. 8 or 9 was used instead of the polarized beam splitting sheet 36 in the second example. Other structure in the third example was the same as in the second example.

The number of the polarized beam splitting sheets was 4 in FIGS. 8 and 9, but that in the third example was 100.

When the liquid crystal panel (nor illustrated) in this back light device was set to a transmissive mode and the maximum brightness of the light outputted from the polarizing plate at the front face side was measured, 50% improved brightness was obtained, as compared with the back light device not using any light diffusing sheet nor polarized beam splitting sheet.

The present invention has the aforementioned structure; therefore, by means of the light diffusing sheet the maximum intensity direction of the diffused light from the lightconductor can be shifted nearer to the direction of the normal standing on the light outputting surface, that is, nearer to the angle of incident light which makes the polarized beam splitting effect of the polarized beam splitting sheet maximum. This makes it possible to obtain a back light device which is thin, low-priced, highly efficient and suitable for mass production and which has a few parts This back light device is used as a back light source for a liquid crystal apparatus so that the polarized light transmissive axis of the polarizing plate at the back light side of the liquid crystal panel can be consistent with the axis of the polarized light outputted from the back light device. Thus, the polarized light can be transmitted efficiently so that brightness on the liquid crystal panel can be improved.

What is claimed is:

1. A back light device comprising:

a light source;

a lightconductor in a substantial plate form comprising a front face, a back face and side end faces, light radiated from the light source and made incident on the one of the side end faces being output as a first diffused light having a peak oblique lo the normal standing on a light outputting surface therefrom which is the front face;

at least one light diffusing sheet for receiving, on its face, the first diffused light output from the light outputting surface of the lightconductor, and outputting a second diffused light having a directivity from a light outputting surface of the diffusing sheet opposite to the face of the diffusing sheet, the light outputting surface of the light diffusing sheet being rougher than the face of the at least one light diffusing sheet, the tight diffusing sheet has a haze value of 30% or more and shifts the direction of the maximum intensity of the second diffused light toward the direction of the normal standing on the light outputting surface of the diffusing sheet by virtue of the rougher light outputting surface;

a polarized beam splitting sheet which receives the second diffused light from the light outputting surface of the light diffusing sheet, through which one polarized light component of the second diffused light is transmitted, and on which the other polarized light component is reflected; and a light reflecting sheet which is arranged on the back face of the lightconductor and is for reflecting a light into the lightconductor, the light diffusing reflectivity of the light reflecting sheet being 70 or more.

2. A back light device according to claim 1, wherein the polarized beam splitting sheet is a laminated body having 3 or more layers wherein the layers adjacent to each other in its thickness direction have different refractive indexes; and one of incident P and S polarized light beams are transmitted through the sheet and the other is reflected on the sheet, thereby splitting both of the polarized light beams.

3. A back light device according to claim 1, wherein the polarized beam splitting sheet includes a circularly polarized light selecting layer comprising a cholesteric liquid crystal layer, and a ¼ phase differentiation layer, and by means of the cholesteric liquid crystal layer incident light is split into a right circular polarized light and a left circular polarized light.

4. A back light device according to claim 1, wherein the polarized beam splitting sheet has a planar laminated structure having three or more layers each of which has double refraction; and a refractive index difference between the layers adjacent to each other along its thickness direction for one of two light beams having vibration directions perpendicular to each other in a plane is different from the difference in the refractive index between the layers adjacent to each other along its thickness direction for the other of the two light beams.

5. A back light device according to claim 1, wherein the light diffusing sheet is composed of a light-transmissive material wherein its light outputting surface is rougher than its light receiving surface.

6. A back light device for a liquid crystal display apparatus according to claim 1, wherein light diffusion effects of the first diffused light and the second diffused light caused by the lightconductor and the light diffusing sheet are different from each other.

7. A back light device for a liquid crystal display apparatus according to claim 1, wherein a light diffusion effect of the second diffused light caused by the light diffusing sheet is higher than a light diffusion effect of the first diffused light caused by the lightconductor.

8. A back light device for a liquid crystal display apparatus comprising the back light device and a liquid crystal panel, wherein the back light device comprising a light source, a lightconductor in a substantial plate form comprising a front face, a back face and side end faces, light radiated from the light source and made incident on the one of the end side faces being output as a first diffused light having a peak oblique to the normal standing on a light outputting surface therefrom which is the front face, at least one light diffusing sheet for receiving, on its face, the first diffused light output from the light outputting surface of the lightconductor, and outputting a second diffused light, having a directivity from a light outputting surface of the at least one light diffusing sheet opposite to the face of the at least one light diffusing sheet, the light outputting surface of the at least one light diffusing sheet being rougher than the face of the at least one light diffusing sheet, the light diffusing sheet has a haze value of 30% or more and shifts the direction of the maximum intensity direction of the second diffused light toward the direction of the normal standing on the light outputting surface of the diffusing sheet by virtue of the rougher light outputting surface, a polarized beam splitting sheet which receives the second diffused light front the light outputting surface of the light diffusing sheet, through which one polarized light component of the second diffused light is transmitted, and on which the other polarized light component is reflected, and a light reflecting sheet which is arranged on the back face of the lightconductor and is for reflecting a light into the lightconductor, the light diffusing reflectivity of the light reflecting sheet being 70 or more, and the liquid crystal panel is arranged at the light outputting surface side of the polarized beam splitting sheet of the back light device.

9. A back light device for a liquid crystal display apparatus according to claim 8, wherein the polarized beam splitting sheet is a laminated body having 3 or more layers wherein the layers adjacent to each other in its thickness direction have different refractive indexes; and one of incident P and S polarized light beams are transmitted through the sheet and the other is reflected on the sheet, thereby splitting both of the polarized light beams.

10. A back light device for a liquid crystal display apparatus according to claim 8, wherein the polarized beam splitting sheet includes a circularly polarized light selecting layer comprising a cholesteric liquid crystal layer, and a ¼ phase differentiation layer; and by means of the cholesteric liquid crystal layer incident light is split into a right circular polarized light and a left circular polarized light.

11. A back light device for a liquid crystal display apparatus according to claim 8, wherein the polarized beam splitting sheet has a planar laminated structure having three or more layers each of which has double refraction; and a refractive index difference between the layers adjacent to each other along its thickness direction for one of two light beams having vibration directions perpendicular to each other in a plane is different from the difference in the refractive index between the layers adjacent to each other along its thickness direction for the other of the two light beams.

12. A back light device for a liquid crystal display apparatus according to claim 8, wherein the light diffusing sheet is composed of a light transmissive material wherein its light outputting surface is rougher than its light receiving surface.

* * * * *